Nov. 2, 1948.    E. A. REHBERGER    2,452,681
HEAVY DUTY TRAILER
Filed June 28, 1947    6 Sheets-Sheet 1
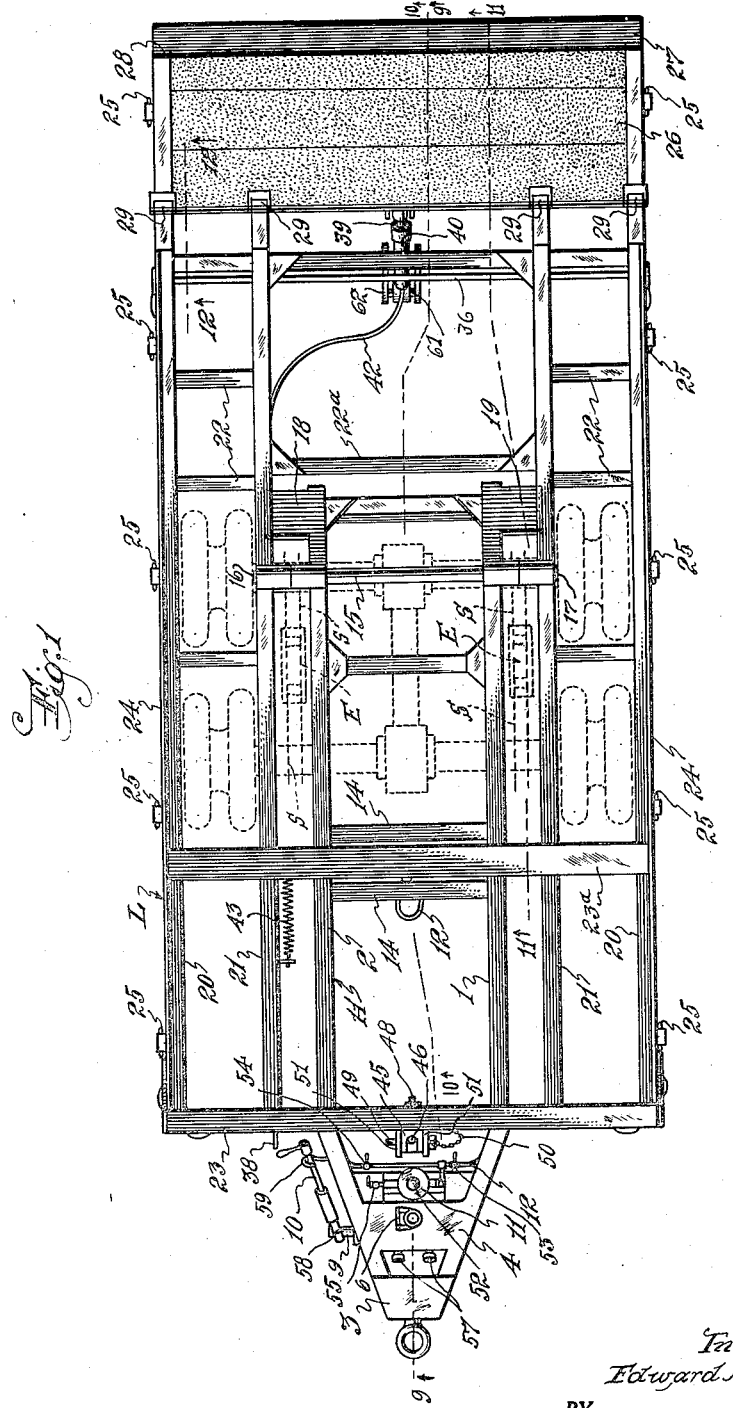
Inventor:
Edward A. Rehberger:
BY A. D. T. Libby
Attorney.

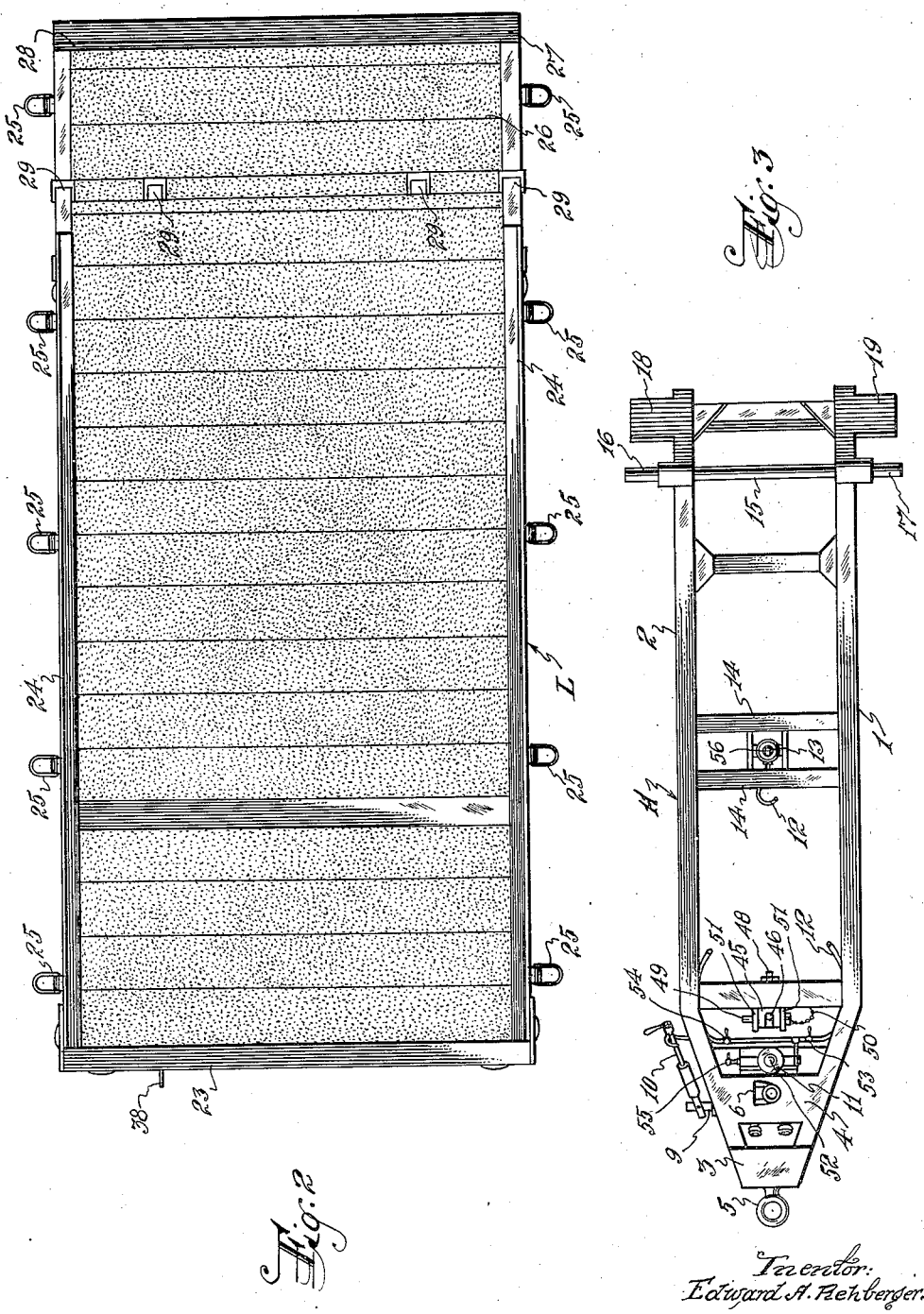

Nov. 2, 1948.  E. A. REHBERGER  2,452,681
HEAVY DUTY TRAILER
Filed June 28, 1947  6 Sheets-Sheet 3
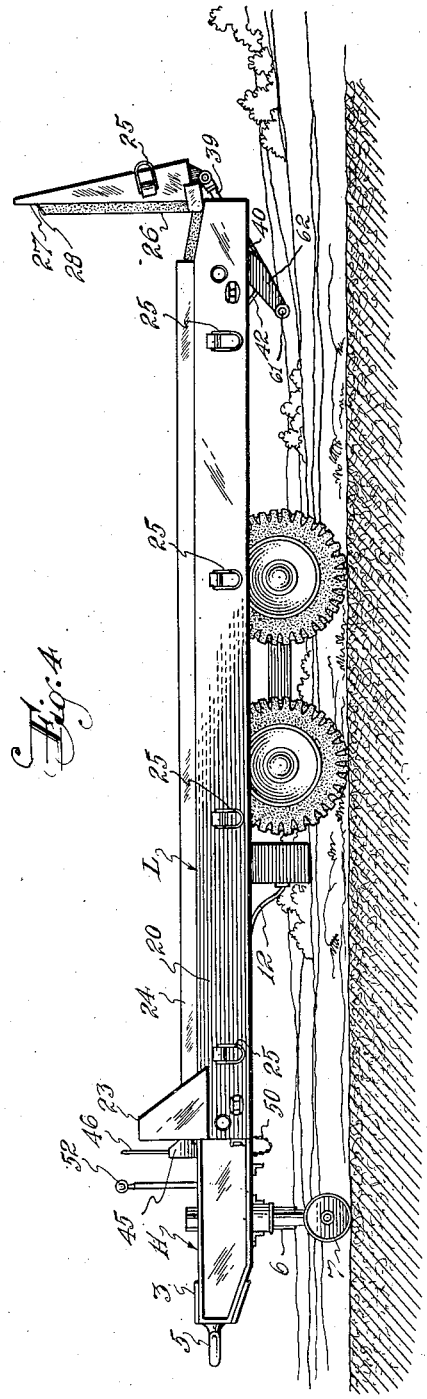
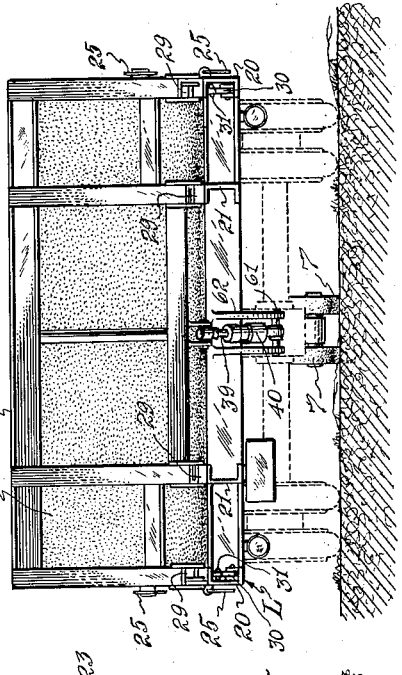
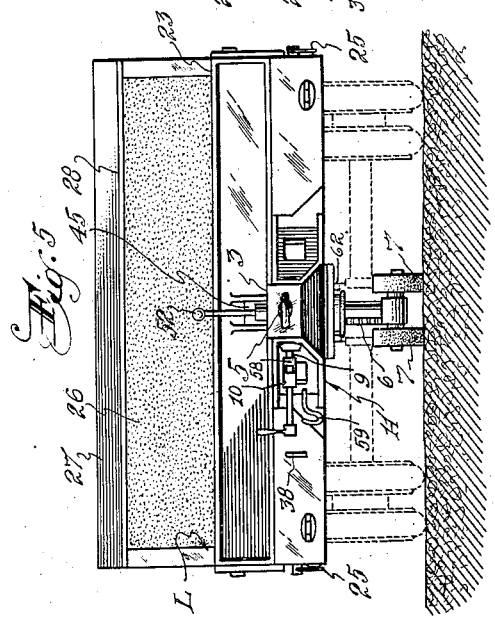
Inventor:
Edward A. Rehberger:
BY A. D. T. Libby
Attorney.

Nov. 2, 1948.  E. A. REHBERGER  2,452,681
HEAVY DUTY TRAILER
Filed June 28, 1947  6 Sheets-Sheet 4
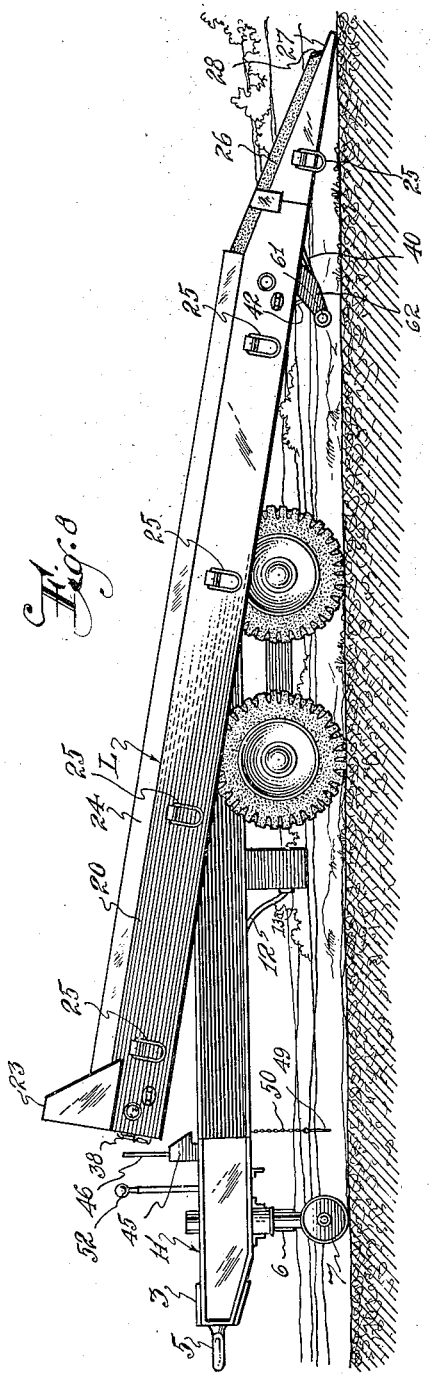
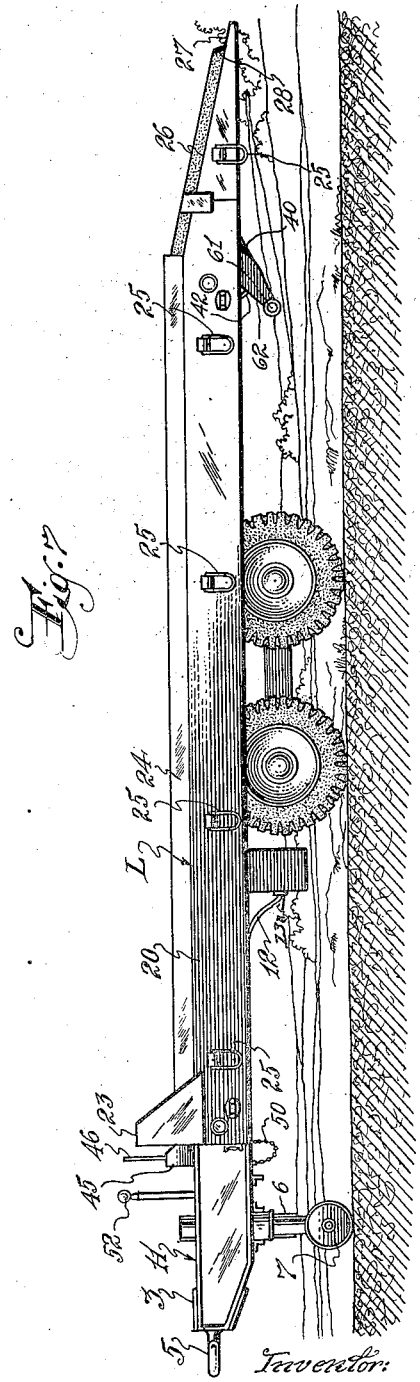
Inventor:
Edward A. Rehberger
BY
A. D. T. Libby
Attorney.

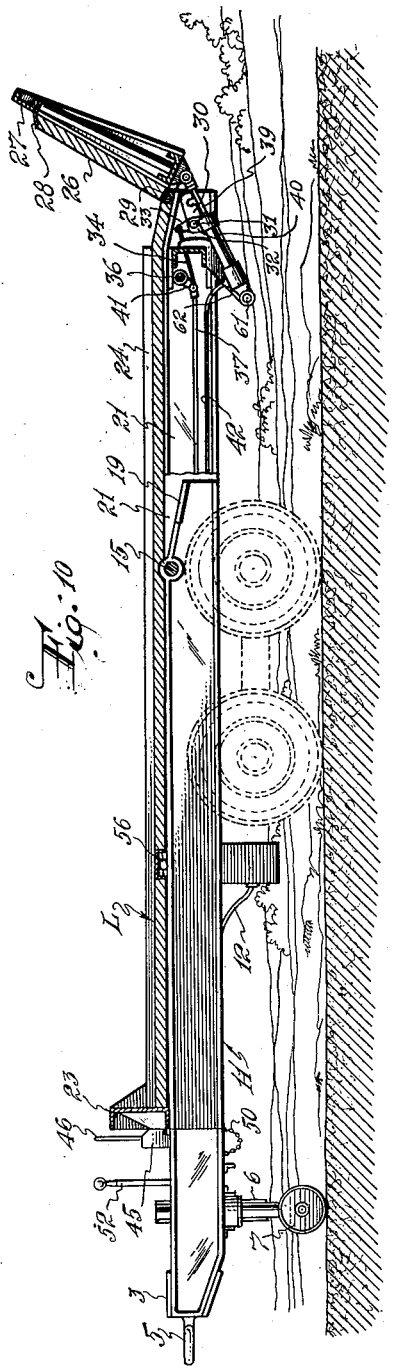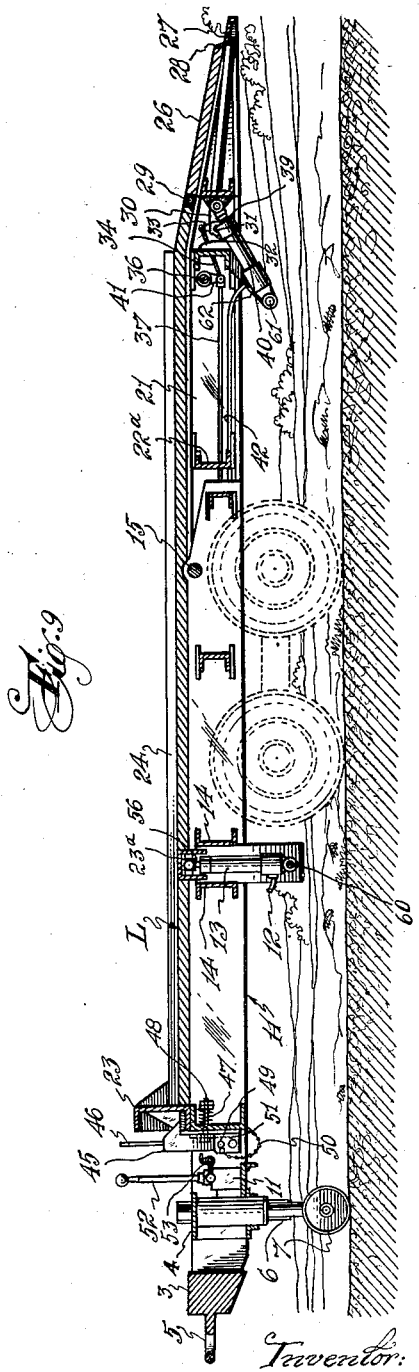

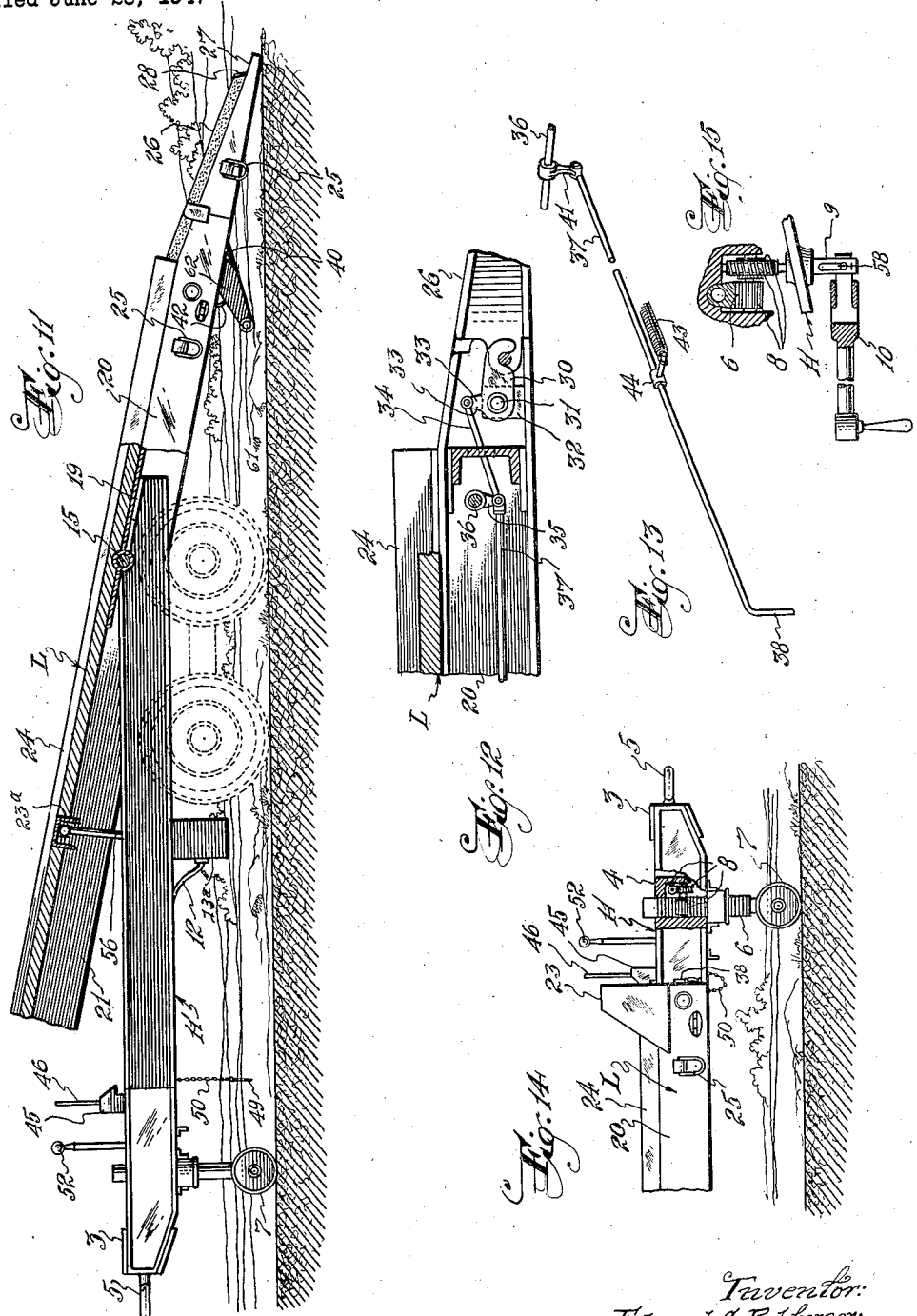

Patented Nov. 2, 1948

2,452,681

UNITED STATES PATENT OFFICE 2,452,681

HEAVY-DUTY TRAILER

Edward A. Rehberger, South Orange, N. J.

Application June 28, 1947, Serial No. 757,837

11 Claims. (Cl. 214—85)

This invention relates to a heavy duty trailer, especially adapted for loading, carrying, and unloading large tractors, scrapers, bulldozers, and the like. Practically all of these large machines have caterpillar tractors or wheels having metallic teeth thereon which are injurious to practically all highways, and the problem of transporting such machinery has become quite a problem.

It is, therefore, the principal object of my invention to provide a trailer than can be readily attached to the rear end of a suitable automotive vehicle, such as a truck, and one in which the machine or apparatus to be transported can be easily loaded and unloaded onto the trailer.

Another object of my invention is to provide a trailer for the purpose described which is very sturdy, yet can be produced at a relatively low cost.

A further object is to provide a trailer having two sections or frames which are so related that one may be rotatable about the other in such a manner as to make it easy to load the apparatus onto the trailer.

These and other objects will be discerned from a reading of the following specification taken in connection with the annexed drawings wherein:

Figure 1 is a plan view of the framework of the trailer with the platform members removed, the operating wheels and the axles being shown in dotted lines.

Figure 2 is a plan view of the loading or platform frame comprising one of the sections of the trailer.

Figure 3 is a skeleton view of the hauling or chassis framework without the supporting wheels.

Figure 4 is a side elevation of the complete trailer with the extreme rear end, which I term a ramp, in its stop position.

Figure 5 is a view of Figure 4 looking at the front end, i. e. from left to right.

Figure 6 is a view of the rear end of Figure 4, i. e., looking from right to left, the wheels being shown in dotted position.

Figure 7 is a view similar to Figure 4 but with the rear end or ramp in its normal or horizontal position.

Figure 8 is a view similar to Figure 7 but with the loading or platform section or frame tilted so that the ramp is in contact with the terrain for loading purposes.

Figure 9 is a section on the line 9—9 of Figure 1 with the ramp in normal position as in Figure 7.

Figure 10 is a section on the line 10—10 of Figure 1, but with the ramp elevated to nearly its full stop position.

Figure 11 is a view on the line 11—11 of Figure 1, but with the loading frame tilted into loading position.

Figure 12 is a fragmentary section on the line 12—12 of Figure 1 showing the means for locking the ramp in loading position.

Figure 13 is a view of the control rod for operating the locking mechanism shown in Figure 12.

Figure 14 is a part elevational and part sectional view taken at the front end of the trailer showing the positioning rollers as supporting the front end of the trailer when detached from a moving vehicle, and further showing a gear combination for raising the front end of the trailer so as to bring the attachment device in proper alignment with the pulling vehicle.

Figure 15 is a part sectional and part elevational view of the gear combination shown in Figure 14.

In the drawings wherein like numbers refer to corresponding parts in the various views, the trailer to be described includes two sections, or frames. The hauling or chassis frame is generally designated by the letter H. The skeleton of which is shown in Figure 3. The loading or platform section or frame is generally designated by the letter L. Frame H has two longitudinally extending side member girders 1 and 2 preferably in the form of channel irons which have their forward ends turned inwardly toward each other and anchored together as by welding through the medium of suitable type plates such as 3 and 4. Also to this front end is fastened as by welding an attachment device 5 in the form of an eye bolt. This forward end also carries a rack 6 to which is fastened a positioning roll in the form of a pair of small trucks 7. A suitable gear combination comprising a pinion and associated worm screws 8, operated by shaft 9 and crank 10 serve to raise and lower the front end of the frame H, as well as the frame L which is fastened thereto in a manner to be later described.

This front end of the frame H also carries a hydraulic pump 11 which is connected by a pipe 12 to a cylinder 13, the purpose of which will be later described.

As will be seen from Figure 3, the side girders 1 and 2 are anchored together by a plurality of cross bars 14 welded thereto. At the rear end of the frame H is carried a rod 15 on the ends 16 and 17 of which is pivoted the frame L to be presently described. Preferably the rod 15 is located in a vertical plane over the axle carrying one set of road wheels. The rear end of frame H also tapers downwardly (see Figures 9 and 10) and is provided with laterally extending flanges 18 and 19 which assist in supporting the end of the frame support springs carried by one of the wheel axles.

The loading or platform frame H is made up of two pair of side members or girders 20 and 21, preferably in the form of channel irons similar to the girders 1 and 2. Each pair of girders 20 and 21 are anchored together by a plurality of braces 22, preferably welded into position. At the front end of the frame L there is located a strap or cross bar 23 across the channel irons which acts to anchor all four of the girders 20 and 21 together and to act as a front stop for the platform which can be made of planks transversely positioned across the girders. Side stops 24, in the form of angle irons may be utilized as shown in Figure 2. The outer girders 20 are provided with movable links 25 for the purpose of receiving binding chains or ropes, or some holding means for holding the structure onto the platform.

The rear end of the frame L terminates in a ramp 26 which may have a wood surface terminating at its edge in the form of a channel iron 27 and a protecting metallic strip 28. The ramp 26 is pivoted at 29 to the side girders 20 and is locked into position by latches 30, one associated with each of the outside girders 20. Each latch 30 is pivoted on its stud 31 carried by a support 32. Each latch 30 has an arm 33 to which is connected a rod 34 that in turn is connected to an arm 35 fastened to a cross rod 36. To an arm 41 fastened to rod 36 is attached a pull rod 37 which extends to the front of the frame L and terminates in a handle 38 so that a pull on the handle 38 will cause the pull rod 37, through the medium of the rod 41 to turn the rod 36 and cause the release of the latches 30 to free the ramp 26 whereby it may be elevated through the medium of a plunger 39 operated by a hydraulic cylinder 40 pivoted on a pin 61 carried by a support 62. The cylinder 40 is connected by a pipe 42 with the hydraulic pump 11 carried by the frame H, as heretofore described. A spring 43 has one end anchored to the frame L and the other end is fastened to an attachment 44 secured to the rod 37 so that when the handle 38 is released, spring 43 will return the latches 30 to their normal ramp locking position.

The frame H pivotally carries a locking or latching arm 45 that engages the cross member 23 of the frame L. The latch is released by a handle 46 so the frame may be tilted in a manner to be presently described. A spring 47 acting on a headed stud 48 that is connected to the latch 45 serves to prevent the latch from being released from the locking position while the trailer is in motion, should the locking pin 49, connected to a chain 50 be rattled out of locking position. When the latch 45 is pulled out of locking position by the handle 46, after first pulling out the locking pin 49, the pin 49 will be inserted through the holes in the latch member support 51 and back of the latch 45 to hold it in released position while the operator is tilting the frame L.

This tilting operation is performed through the medium of a lever 52 which actuates the hydraulic device 11. In order to tilt the frame L the valves 54 and 55 are closed and valve 53 is opened. The operation of the handle 52 will cause the fluid in the hydraulic cylinder 11 to force the fluid through the pipe 12 into the cylinder 13 and cause its plunger 56 to move upwardly against the L frame cross bar 23a and cause the frame L to be tilted about its pivot 15 (see Figure 11), thereby placing the frame L in loading position, it being assumed that the ramp 26 is in the position shown in Figure 11. The cylinder 13 is pivoted at 60 to the support member 13a so that its plunger 56 may move outwardly therefrom in a straight line. Preferably the plunger 56 terminates in a ball or circular formation to better follow the movement of the frame L. To lower the platform the valve 54 is closed and valve 55 is opened along with 53 which is already in open position. This will allow the frame or platform L to turn to horizontal position.

In order to raise the tail gate or ramp, the valves 53 and 55 are closed and valve 54 is open and then the pump handle is operated, it being assumed that the handle 38 is operated to release the latches 30. To lower the tail gate or ramp 26, the valve 53 is closed and valves 54 and 55 are opened and if the tail gate should be in the position shown in Figure 5, it will automatically return to horizontal position. If the ramp is not in the position shown in Figures 4 and 6, a slight actuation of the handle is necessary to start the downward motion.

It may be mentioned in passing that when the frame L is tilted in the manner described the wheels, especially the forward set, will not be lifted from the terrain because of an equalizer construction illustrated in dotted lines in Figure 1 and designated by the letter E. The springs being designated by the letter S. The equalizer arrangement, however, forms no part of my present invention, and neither does the construction of the wheels, their axles and associated parts including the brakes, and hence need not be described, except to say that connecting members 57 are shown in the left hand end of Figure 1 for connecting lines from a pulling vehicle to operate the brakes on the wheels of the trailer. It may be further mentioned in passing that for lighter work only one axle with cooperative wheels may be used. It will be noted that the wheels are positioned between the side girders 20 and 21 of the frame L. It may be also noted that the handle 10, when not being used is adapted to be moved through a swivel arrangement 58, and turned so as to be placed in a retaining hook 59.

From what has been said, it will be obvious that in a large structure of this kind many of the details may be varied without departing from the spirit of my invention or the scope of the impending claims.

Having thus described my invention, what I claim is:

1. A trailer including a hauling or chassis frame having a road wheel structure attached at one end and hauling means at the other end with a positioning roll near the latter end, a loading or platform type of frame pivotally carried on the first mentioned frame with hydraulic means hand operative from in front of the end of the loading frame for tilting the loading frame about the pivot so its rear extremity may be brought into engagement with the terrain whereby structures to be loaded, may be readily moved onto it, said means then being operable to bring the loading frame back to normal horizontal position and means for anchoring the loading frame in normal load carrying position.

2. A trailer as defined in claim 1 further characterized in that the hauling and loading structures are made of straight girders and the loading end of the frame has a combined loading and stop ramp with means located at the front end of the loading frame for actuating devices at the rear of the loading frame to move said ramp into either of its two operative positions and also for actuating the tilting means.

3. A trailer as defined in claim 1 further characterized in that the pivot comprises a rod extending across the end of the hauling frame into bearings on the loading frame preferably in a vertical plane over the axle of a set of the road wheels.

4. A trailer as defined in claim 1 further characterized in that the means for tilting the loading frame includes a cylinder pivotally carried by the hauling frame just forward of the forward set of road wheels and a plunger associated with the cylinder for operatively engaging the loading frame and hydraulic means carried by the hauling frame adjacent the front end of the loading frame for activating said cylinder plunger.

5. A trailer as defined in claim 1 further characterized in that the positioning roll includes a pair of spaced rollers attached to a rack operatively carried by the hauling frame with a gear combination in mesh with the rack and means for operating the gear combination whereby the whole front end of the trailer may be raised and lowered and further means associated with the wheel structure for allowing the whole front end of the trailer to be raised and lowered without lifting the wheels per se off the terrain.

6. A trailer including a pair of frames, a hauling or chassis frame and a loading or platform type frame, the loading frame comprising a pair of spaced longitudinally extending girders on opposite sides to receive the platform members with cross brace members at least between said pairs of girders, the hauling frame having a pair of spaced longitudinally extending girders positioned between the inner of said pairs of girders of the loading frame, a plurality of road wheels carried by one or more axles transversely positioned and operatively connected to the inner end of said hauling frame, the wheels being located between said pairs of spaced girders of the loading frame, the loading frame being tiltable on the hauling frame the latter of which has means at its front end for attachment to a hauling vehicle and hydraulic means on the hauling frame and hand operable from in front of the loading frame for tilting the loading frame.

7. A trailer as set forth in claim 6 further defined in that the loading frame has a structure pivotally mounted at its rear end with means having a part extending to the front end of the loading frame for moving said structure from its nomal ramp position to a position where it will serve as a load stop, said structure being moved by the same apparatus in the front end of the trailer, that controls the tilting of the loading frame to ramp acting position when the loading frame is tilted.

8. A trailer as set forth in claim 6 further defined in that the girders for both frames are preferably in the form of channel irons, those forming the hauling frame having their forward ends turned inwardly toward each other and anchored together as by welding, the hauling attachment means being fastened to the junction of these ends, a rollable support also fastened to this end and having screw operative means for raising and lowering this end of the trailer, the forward end of the loading frame terminating back of said hauling frame end and means at this terminating end for locking the two frames together.

9. A trailer as set forth in claim 6 further defined in that the girders for both frames are preferably in the form of channel irons, those forming the hauling frame having their rear ends tapering downward and having laterally extending flanges to assist in supporting the ends of frame support springs carried by a wheel axle.

10. A trailer as set forth in claim 6 further defined in that the outer girders of the loading frame have side stop members extending longitudinally of their length along their edges while these same outer girders have a plurality of attachment means for binding the load to the loading frame.

11. A trailer as set forth in claim 6 further defined in that the loading frame has a ramp pivotally mounted on its rear end, latches located on at least the outer girders of said loading frame to hold the ramp in its loading position, means for releasing said latches including a rod extending to the front end of said frame with means at the end of the rod for operating it to release the latches, a spring connected to said rod for returning it and the latches to locking position and hydraulic means connected to the ramp with means at the front end of the trailer for activating said hydraulic means to cause said means to move the ramp to load stop position.

EDWARD A. REHBERGER.

REFERENCES CITED

The following references are of record in the file of this patent:

UNITED STATES PATENTS

| Number | Name | Date |
|---|---|---|
| 1,400,351 | Falco | Dec. 13, 1921 |
| 1,891,517 | Williams | Dec. 20, 1932 |
| 2,099,684 | Fitch | Nov. 23, 1937 |
| 2,173,277 | Jarmin et al. | Sept. 19, 1939 |
| 2,318,802 | Reid | May 11, 1943 |
| 2,364,365 | Hultquist | Dec. 5, 1944 |
| 2,411,183 | Baldwin | Nov. 19, 1946 |
| 2,418,567 | Ausherman | Apr. 8, 1947 |

FOREIGN PATENTS

| Number | Country | Date |
|---|---|---|
| 446,483 | Great Britain | Apr. 30, 1936 |
| 477,423 | Great Britain | Dec. 30, 1937 |